US011657324B2

(12) United States Patent
Li et al.

(10) Patent No.: US 11,657,324 B2
(45) Date of Patent: May 23, 2023

(54) METHOD, ELECTRONIC DEVICE, AND COMPUTER PROGRAM PRODUCT FOR PROCESSING DATA

(71) Applicant: EMC IP Holding Company LLC, Hopkinton, MA (US)

(72) Inventors: Jin Li, Shanghai (CN); Jinpeng Liu, Shanghai (CN); WuiChak Wong, Xiamen (CN)

(73) Assignee: EMC IP Holding Company LLC, Hopkinton, MA (US)

(*) Notice: Subject to any disclaimer, the term of this patent is extended or adjusted under 35 U.S.C. 154(b) by 332 days.

(21) Appl. No.: 16/886,131

(22) Filed: May 28, 2020

(65) Prior Publication Data

US 2021/0342741 A1 Nov. 4, 2021

(30) Foreign Application Priority Data

Apr. 30, 2020 (CN) .......................... 202010367906.2

(51) Int. Cl.
*G06F 17/00* (2019.01)
*G06T 1/00* (2006.01)
(Continued)

(52) U.S. Cl.
CPC ............. *G06N 20/00* (2019.01); *G06F 17/16* (2013.01); *G06T 1/20* (2013.01)

(58) Field of Classification Search
USPC ....... 358/1.1–3.29, 1.11–1.18; 382/276–307; 706/1–62; 708/201–524
See application file for complete search history.

(56) References Cited

U.S. PATENT DOCUMENTS

2018/0307980 A1* 10/2018 Barik .................... G06F 9/3877
2019/0324810 A1    10/2019 Zhao et al.
2020/0167637 A1*  5/2020 Park ....................... G06F 17/16

FOREIGN PATENT DOCUMENTS

| CN | 108986136 | * 12/2018 | ............. G06T 7/285 |
| CN | 110969565 | *  4/2020 | ............. G06T 1/20 |
| IL |    271121 | *  1/2020 | ............. G16H 70/60 |

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.

(Continued)

*Primary Examiner* — Marcellus J Augustin
(74) *Attorney, Agent, or Firm* — Ryan, Mason & Lewis, LLP (57) ABSTRACT

Embodiments of the present disclosure relate to a method, an electronic device, and a computer program product for processing data. According to exemplary implementations of the present disclosure, a method for processing data includes: determining a factor associated with a first input of a deep learning model, wherein the factor affects the number of threads for executing the deep learning model; generating a plurality of first partial inputs by using the first input based on the factor, wherein each first partial input in the plurality of first partial inputs is a part of the first input; and performing an operation on the plurality of first partial inputs by using the deep learning model, and generating an output of the deep learning model. Thereby, the data processing performance can be improved, and the resource requirement for data processing is lowered.

20 Claims, 8 Drawing Sheets

(51) Int. Cl.
  *G06N 20/00* (2019.01)
  *G06T 1/20* (2006.01)
  *G06F 17/16* (2006.01)

(56) References Cited

OTHER PUBLICATIONS

Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901,02067v1, Jan. 7, 2019, 13 pages.
U.S. Appl. No. 16/540,385 filed in the name of Jinpeng Liu et al. filed Aug. 14, 2019, and entitled "Method, a Device and a Computer Program Product for Determining a Resource Required for Executing a Code Segment."
U.S. Appl. No. 16/542,757 filed in the name of Jinpeng Liu et al. filed Aug. 16, 2019, and entitled "Method, Device and Computer Program Product for Processing Machine Learning Model."
U.S. Appl. No. 16/678,758 filed in the name of Jinpeng Liu et al. filed Nov. 8, 2019, and entitled "Method, Electronic Device and Computer Program Product for Processing Machine Learning Model."
U.S. Appl. No. 16/789,006 filed in the name of Jin Li et al. filed Feb. 12, 2020, and entitled "Scheduling Artificial Intelligence Model Partitions Based on Reversed Computation Graph."
U.S. Appl. No. 16/823,445 filed in the name of Jinpeng Liu et al. filed Mar. 19, 2020, and entitled "Task Scheduling Method, Electronic Device, and Computer Storage Medium."
U.S. Appl. No. 16/845,692 filed in the name of Jinpeng Liu et al. filed Apr. 10, 2020, and entitled "Method, Device and Computer Program Product for Processing Computing Job."

\* cited by examiner

METHOD, ELECTRONIC DEVICE, AND COMPUTER PROGRAM PRODUCT FOR PROCESSING DATA

RELATED APPLICATION(S)

The present application claims priority to Chinese Patent Application No. 202010367906.2, filed Apr. 30, 2020, and entitled "Method, Electronic Device, and Computer Program Product for Processing Data," which is incorporated by reference herein in its entirety.

FIELD

Embodiments of the present disclosure generally relate to data processing, and in particular, to a method, an electronic device, and a computer program product for processing data.

BACKGROUND

At present, deep learning is widely used in many data processing fields, such as search technologies, data mining, machine learning, machine translation, natural language processing, multimedia learning, recommendation, and personalization technologies. Deep learning enables machines to imitate human activities such as audio-visual and thinking, solves many complex pattern recognition problems, and enables significant progress in artificial intelligence-related technologies. However, deep learning usually requires a significant amount of calculations. Therefore, the performance of deep learning needs to be improved.

SUMMARY

Embodiments of the present disclosure provide a method, an electronic device, and a computer program product for processing data.

In a first aspect of the present disclosure, a method for processing data is provided. The method includes: determining a factor associated with a first input of a deep learning model, wherein the factor affects the number of threads for executing the deep learning model; generating a plurality of first partial inputs by using the first input based on the factor, wherein each first partial input in the plurality of first partial inputs is a part of the first input; and performing an operation on the plurality of first partial inputs by using the deep learning model, and generating an output of the deep learning model.

In a second aspect of the present disclosure, an electronic device is provided. The device includes at least one processing unit and at least one memory. The at least one memory is coupled to the at least one processing unit and stores an instruction executed by the at least one processing unit. The instruction, when executed by the at least one processing unit, causes the device to execute actions. The actions include: determining a factor associated with a first input of a deep learning model, wherein the factor affects the number of threads for executing the deep learning model; generating a plurality of first partial inputs by using the first input based on the factor, wherein each first partial input in the plurality of first partial inputs is a part of the first input; and performing an operation on the plurality of first partial inputs by using the deep learning model, and generating an output of the deep learning model.

In a third aspect of the present disclosure, a computer program product is provided. The computer program product is tangibly stored on a non-transitory computer readable medium and includes a machine-executable instruction; and the machine-executable instruction, when executed, causes a machine to perform any steps of the method according to the first aspect of the present disclosure.

The summary is provided in a simplified form to introduce the selection of concepts, which will be further described in the Detailed Description below. The summary is not intended to identify each and every key feature or essential feature of the present disclosure, nor is it intended to limit the scope of the present disclosure.

BRIEF DESCRIPTION OF THE DRAWINGS

By describing the exemplary embodiments of the present disclosure in more detail in conjunction with the accompanying drawings, the above and other objectives, features, and advantages of the present disclosure will become more apparent. In the exemplary embodiments of the present disclosure, the same reference numerals generally represent the same components.

In the various drawings, the same or corresponding reference numerals represent the same or corresponding parts.

DETAILED DESCRIPTION

The following will describe the preferred embodiments of the present disclosure in more detail with reference to the accompanying drawings. Although the drawings show the preferred embodiments of the present disclosure, it should be understood that the present disclosure can be implemented in various forms and should not be limited by the embodiments described herein. Instead, these embodiments are provided to make the present disclosure clearer and more complete, and to completely convey the scope of the present disclosure to those skilled in the art.

The term "include" and its variants as used herein mean open including, i.e., "including but not limited to." Unless otherwise stated, the term "or" means "and/or." The term "based on" means "at least in part on." The terms "an example embodiment" and "an embodiment" mean "at least one example embodiment." The term "another embodiment"

means "at least one further embodiment." The terms "first," "second," and the like may refer to the same or different objects. Other explicit and implicit definitions may also be included below.

In parallel load balancing scheduling of deep learning models, there may be very heavy calculations. Such calculations require devices such as Graphics Processing Units (GPUs) to execute a large number of threads. However, such calculations are difficult to be scheduled to different devices in a balanced manner (approach), and will cause the performance of the devices to decrease.

For example, kernel functions are very unbalanced in terms of thread requirements. Some heavy kernel functions may consume the maximum number of threads that can be handled by one GPU, while other kernel functions may consume only a very small number of threads. In this case, since one heavy kernel function occupies all thread resources on the GPU, other kernel functions have no thread resources. Therefore, even if a plurality of kernel functions are scheduled into the GPU for simultaneous execution, it is impossible to achieve real parallelism.

In addition, this will also impair the performance of the device. When one heavy kernel function and other kernel functions are scheduled into the GPU together for execution, since other kernel functions cannot be executed in parallel with the heavy kernel function, an internal GPU scheduler must schedule all the kernel functions into and out of a kernel of the GPU for execution. Such internal GPU scheduling will be a very large overhead for the GPU. In addition, once all the threads in the GPU are used, additional thread synchronization must be used between all the threads, which is another overhead for the GPU.

According to an example embodiment of the present disclosure, an improved scheme for processing data is provided. In this scheme, a factor associated with an input of a deep learning model is determined. The factor may affect the number of threads configured to execute the deep learning model. Based on the factor, a plurality of partial inputs are generated by using the input. Each partial input in the plurality of partial inputs is a part of the input. Thereby, an operation is performed on the plurality of partial inputs by using the deep learning model, and an output of the deep learning model is generated.

In this way, this scheme may divide the heavy calculation into several appropriate calculations, which will be beneficial to the load balancing and the device performance. In addition, this scheme can also optimize the deep learning model without parallelism to have parallelism, thereby further improving the load balancing and device performance.

Figure 1:
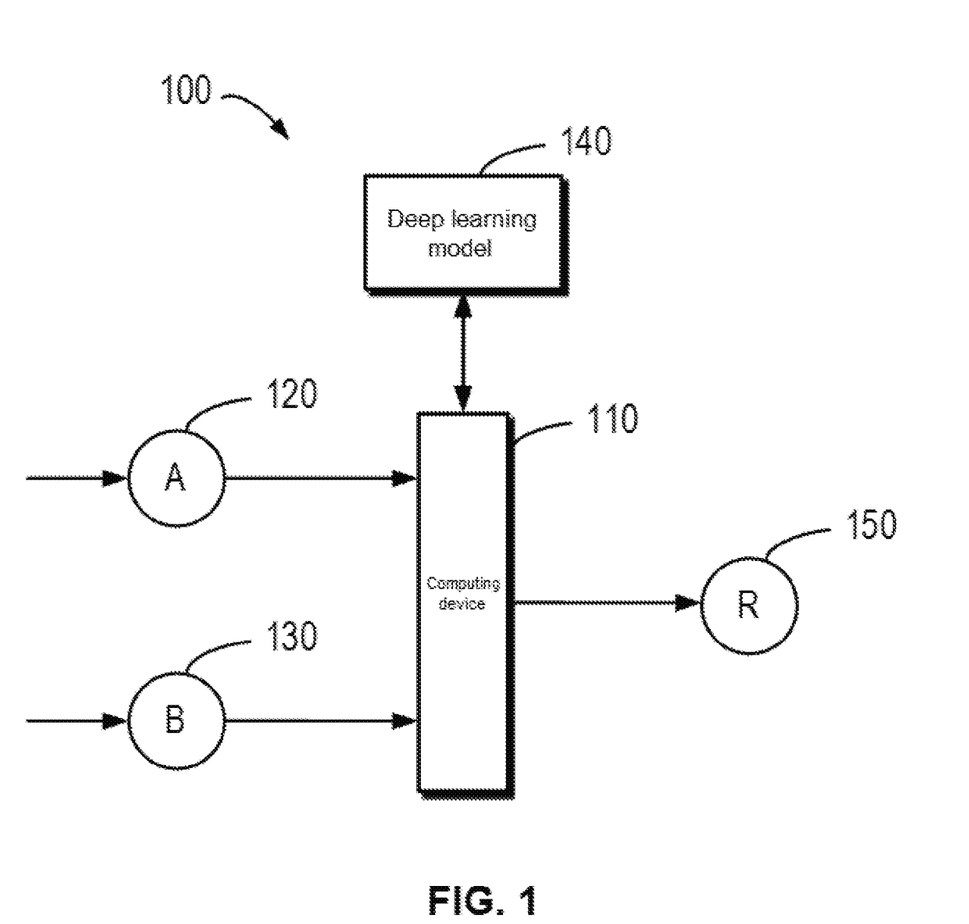
FIG. 1 illustrates a schematic diagram of an example of a data processing environment where some embodiments of the present disclosure can be implemented.

In the following, specific examples of this scheme will be described in more detail with reference to FIGS. 1 to 7. FIG. 1 illustrates a schematic diagram of an example of data processing environment 100 according to some embodiments of the present disclosure. Data processing environment 100 includes computing device 110. Computing device 110 may include, but is not limited to, any devices with computing capacity, such as distributed computing devices, cloud computing devices, mainframe computers, servers, personal computers, desktop computers, laptop computers, tablet computers, personal digital assistants, Central Processing Units (CPUs), and GPUs.

Computing device 110 can acquire an input of deep learning model 140, such as input 120 (hereinafter referred to as "first input 120") and input 130 (hereinafter referred to as "second input 130"). Deep learning model 140 may be any model used for deep learning calculations, such as Cifar-10. Deep learning model 140 may be deployed outside computing device 110 or within computing device 110.

The input of the deep learning model may be information related to any data form such as images, videos, audios, texts, etc. In the following, an image will be taken as an example of the input for ease of description. For example, first input 120 may be a matrix A representing one image, and second input 130 may be a matrix B representing another image. It should be understood that although two inputs are shown in FIG. 1, the number of inputs is not limited to this and may be any suitable larger or smaller number.

Computing device 110 may apply first input 120 and second input 130 to the deep learning model 140 to generate output 150, i.e., a result R. The data volume of first input 120 and/or second input 130 may be very large, which may result in very heavy calculations. To this end, computing device 110 may divide first input 120 and/or second input 130 into a plurality of partial inputs, each of which has only an appropriate data volume, and these partial inputs are applied to the deep learning model to generate output 150.

By dividing the large input into a plurality of small inputs, the load balancing and device performance can be improved. In addition, since the input is divided into the plurality of parts, each part may be processed in parallel, and the deep learning model without the parallelism can also be optimized to have the parallelism.

Figure 2:
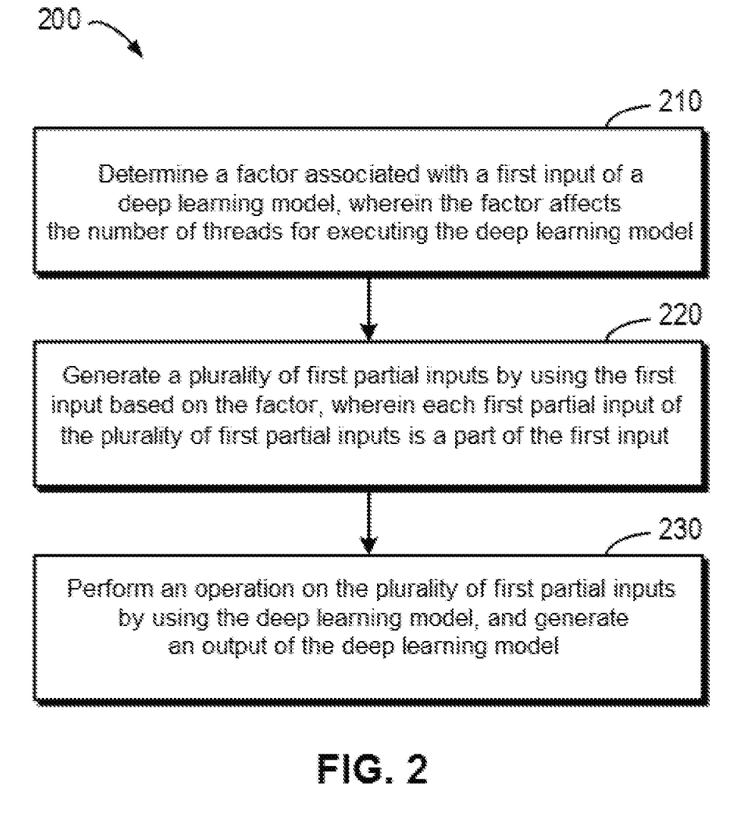
FIG. 2 illustrates a flow chart of a method for processing data according to some embodiments of the present disclosure.

The following will describe the operation performed on computing device 110 in detail in conjunction with FIGS. 2 to 7. FIG. 2 illustrates a flow chart of method 200 for processing data according to some embodiments of the present disclosure. For example, method 200 may be performed by computing device 110 as shown in FIG. 1. It should be understood that method 200 may also include additional steps not shown and/or omit steps shown, and the scope of the present disclosure is not limited in this regard. For ease of understanding, method 200 will be described with reference to FIGS. 3-7.

At 210, computing device 110 determines a factor associated with first input 120 of deep learning model 140. This factor affects the number of threads configured to execute deep learning model 140. It should be noted that in the following, first input 120 is used as an example for description for ease of understanding. In fact, computing device 110 may perform an operation similar to that on first input 120 on second input 130 or any input of deep learning model 140, and vice versa.

In certain embodiments, computing device 110 may determine in advance whether thread resources consumed by deep learning calculations are excessive. For example, computing device 110 may predict whether the number of threads to be used to execute deep learning model 140 exceeds a predetermined thread threshold value. The predetermined thread threshold value may be set according to the nature of deep learning model 140 and the nature of the device for executing deep learning model 140. For example, a higher predetermined thread threshold value may be set for a device with relatively high processing capacity.

If it is determined that the thread resources consumed by the deep learning calculation are excessive, this usually means that the data volume of the input of deep learning model 140 is too large. Therefore, computing device 110 may further determine what factor associated with the input has caused excessive thread resource consumption. In certain embodiments, the input may have various attributes, such as a batch size, a channel number, a height, and a width. For example, the batch size indicates the number of images processed in one batch, the channel number indicates the number of channels (e.g., RGB channels) of the images, the height indicates the number of pixels of the images in a vertical direction, and the width indicates the number of pixels of the images in a transverse direction. The channel number, the height, and the width may become factors that affect the number of threads configured to execute deep learning model 140. In addition, since the height and width characterize the size of an image, they may also be collectively referred to as "size" below.

Computing device 110 may compare the channel number of the image with a channel threshold value. If it is determined that the channel number of the image exceeds the channel threshold value, computing device 110 may determine the factor as the channel number. In addition, computing device 110 may also compare the height and/or width of the image with a size threshold value. If it is determined that the size of at least one of the height or width of the image exceeds the size threshold value, computing device 110 may determine the factor as the size.

At 220, computing device 110 uses the first input to generate a plurality of first partial inputs based on the factor. Each first partial input of the plurality of first partial inputs is a part of the first input. For different factors, different division approaches may be used for the input.

In certain embodiments, when the factor is the channel number, since the calculation for a certain channel is not related to other channels, in this case, the input only needs to be divided according to the channels. Specifically, computing device 110 divides first input 120 into a plurality of partial inputs (hereinafter referred to as "first partial inputs"). The channel number of each first partial input in the plurality of first partial inputs is associated with a channel division threshold value. This division approach will be described with reference to FIG. 3.

Figure 3:
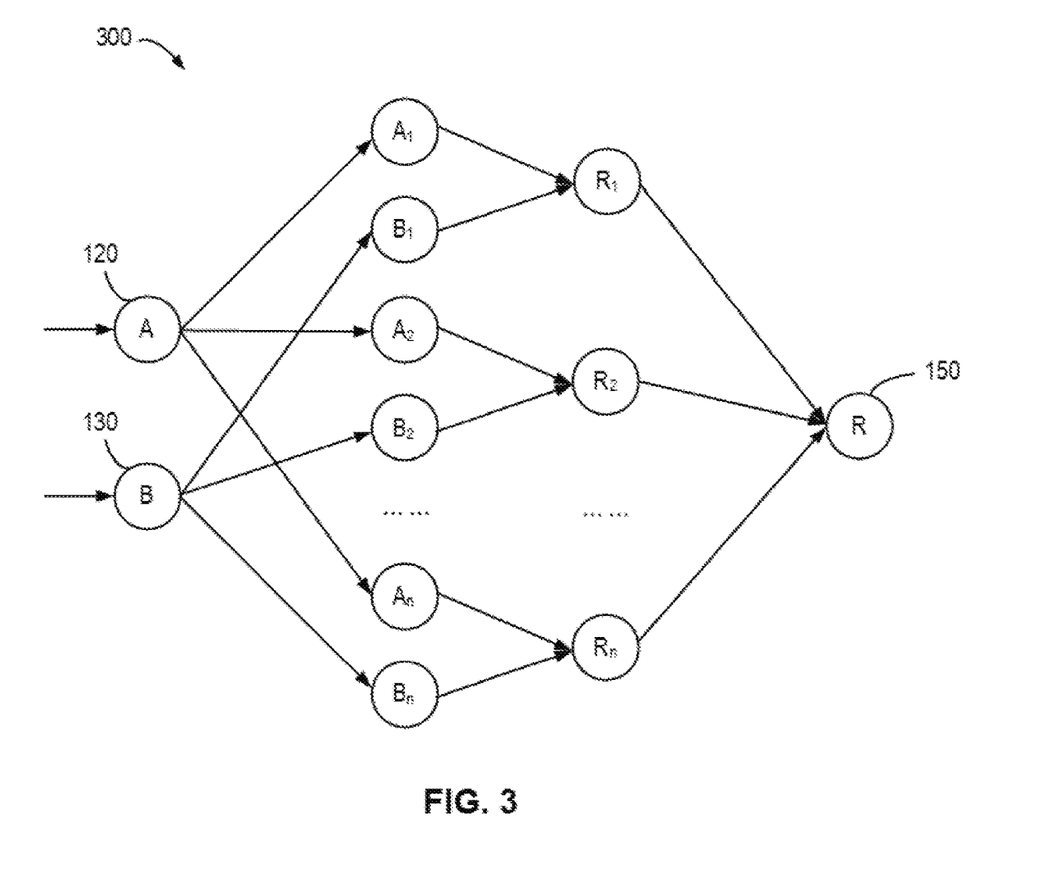
FIG. 3 illustrates a schematic diagram of an example of a channel-based division approach according to some embodiments of the present disclosure.

FIG. 3 illustrates a schematic diagram of an example of channel-based division approach 300 according to some embodiments of the present disclosure. As shown in FIG. 3, first input 120 and the second input are respectively a matrix A representing one image and a matrix B representing the other image. Computing device 110 may divide first input 120 and second input 130 into a plurality of partial inputs, respectively, and the channel number associated with each partial input does not exceed the channel division threshold value. Similar to the thread threshold value, the channel division threshold value also depends on, for example, the nature of the deep learning model and the nature of the device for executing the deep learning model. Specifically, first input 120 is divided into a plurality of partial inputs $A_1$, $A_2$, ..., $A_n$, and second input 130 is divided into a plurality of partial inputs (hereinafter referred to as "second partial inputs") $B_1$, $B_2$, ..., $B_n$.

In certain embodiments, when the factor is the size, the input may be divided in different ways according to the type of the input, the type of the operation to be performed by the deep learning model on the input, and the size of one input relative to another input. For example, regarding the type of the input, since matrices usually cause heavy calculations, and scalars usually do not cause heavy calculations, it is possible to divide the matrices without dividing the scalars.

In addition, regarding the type of the operation and the relative size of the operation, computing device 110 may perform the following operations. In certain embodiments, computing device 110 may determine the type of the operation to be performed by using the deep learning model on the plurality of first partial inputs, and divide first input 120 into the plurality of first partial inputs by using the size division threshold value based on the type.

The type of the operation includes a cross-multiplication operation and an element-wise operation. According to one aspect, when the type of the operation is the cross-multiplication operation, in addition to first input 120, the deep learning model also has second input 130. It is assumed that first input 120 and second input 130 are the matrix A and the matrix B representing images, respectively. Computing device 110 may further determine the relative sizes of the two inputs. If it is determined that the size of first input 120 exceeds the size of second input 130, computing device 110 may divide first input 120 into a plurality of sub-matrices serving as the plurality of first partial inputs. The size of each sub-matrix does not exceed the size division threshold value. Similar to the thread threshold value and the channel division threshold value, the size division threshold value also depends on, for example, the nature of the deep learning model and the nature of the device for executing the deep learning model.

In contrast, if it is determined that the size of first input 120 is less than the size of second input 130, computing device 110 may divide first input 120 into a plurality of intermediate partial inputs. Each intermediate partial input is a matrix including at least one column vector of first input 120. Further, computing device 110 may divide each intermediate partial input of the plurality of intermediate partial inputs into a plurality of sub-matrices serving as the plurality of first partial inputs. The size of each sub-matrix does not exceed the size division threshold value. It should be noted that as described above, computing device 110 may perform an operation similar to that on first input 120 on second input 130 or any input of deep learning model 140, and vice versa. This division approach will be described with reference to FIG. 4.

Figure 4:
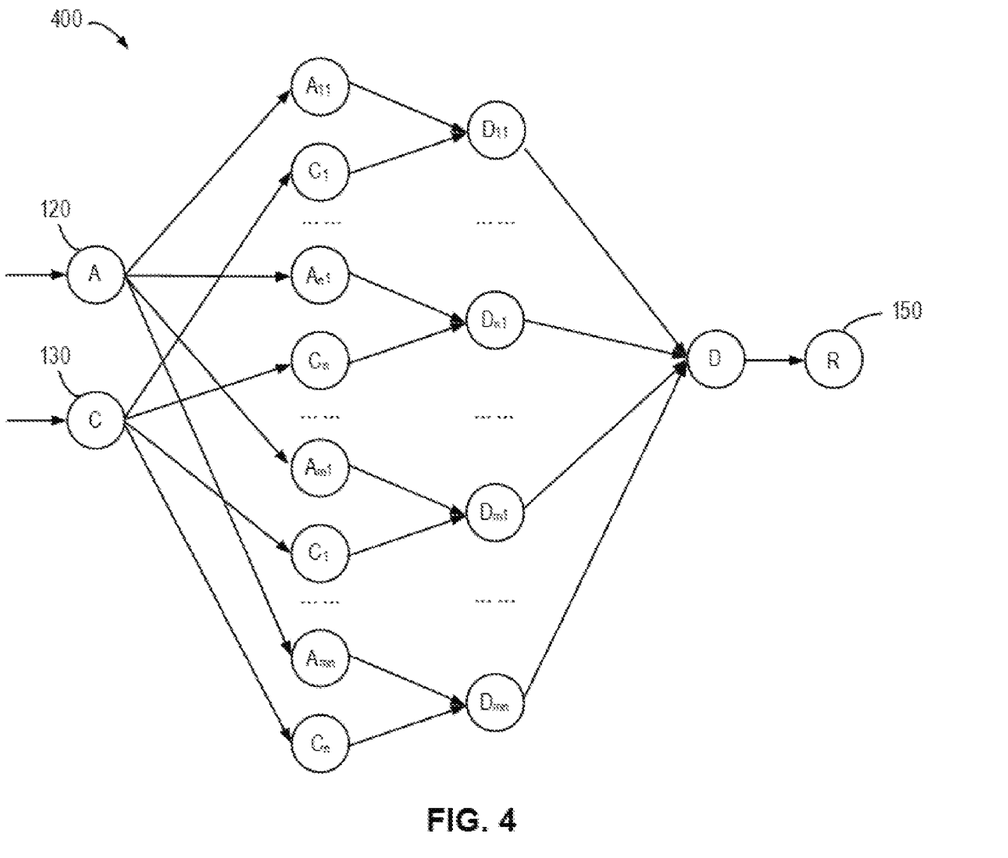
FIG. 4 illustrates a schematic diagram of an example of a cross-multiplication operation division approach according to some embodiments of the present disclosure.

FIG. 4 illustrates a schematic diagram of an example of cross-multiplication operation division approach 400 according to some embodiments of the present disclosure. It is assumed that first input 120 is an m×n matrix A, second input 130 is an n×p matrix B, and the matrix A is larger than the matrix B. As shown in FIG. 4, for the matrix A, computing device 110 may divide it into a plurality of sub-matrices $A_{11}, \ldots, A_{n1}, \ldots, A_{m1}, \ldots A_{mn}$ serving as a plurality of partial inputs. The size of each sub-matrix does not exceed the size division threshold value. Specifically, the number of rows and the number of columns of each sub-matrix do not exceed the size division threshold value.

For the matrix B, computing device 110 may divide it into a plurality of intermediate partial inputs. Each intermediate partial input is a matrix including at least one column vector of the matrix B. For example, FIG. 4 shows a matrix C serving as one intermediate partial input, which is a column vector of the matrix B. Since the matrix B has a total of p columns, there are p intermediate partial inputs.

Further, computing device 110 may divide each intermediate partial input into a plurality of sub-matrices $C_1, \ldots, C_n$ serving as a plurality of partial inputs. The size of each sub-matrix does not exceed the size division threshold value. Specifically, the number of rows and the number of columns of each sub-matrix do not exceed the size division threshold value.

According to another aspect, when the type of the operation is the element-wise operation, computing device 110 divides first input 120 into a plurality of sub-matrices serving as a plurality of first partial inputs. The size of each sub-matrix does not exceed the size division threshold value. This division approach will be described with reference to FIGS. 5-7.

Figure 5:
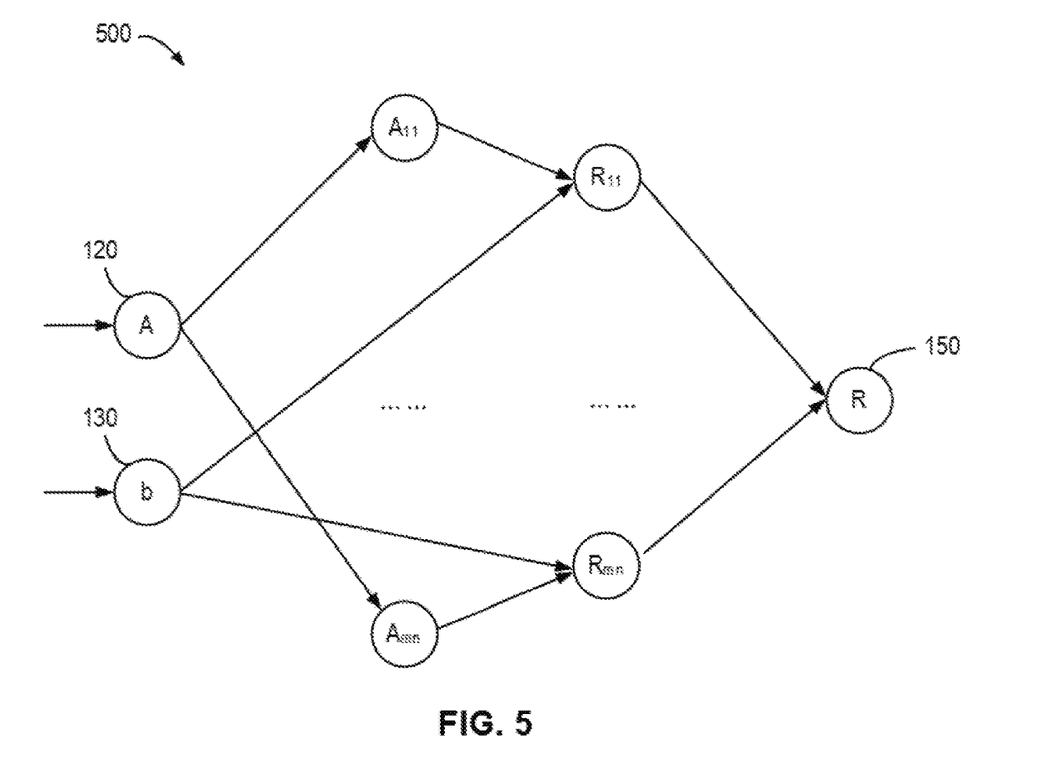
FIG. 5 illustrates a schematic diagram of an example of an element-wise operation division approach between one matrix and one scalar according to some embodiments of the present disclosure.

FIG. 5 illustrates a schematic diagram of an example of element-wise operation division approach 500 between one matrix and one scalar according to some embodiments of the present disclosure. It is assumed that first input 120 is an m×n matrix A, second input 130 is a scalar b, and the element-wise calculation is to add the matrix A to the scalar b(A+b). As shown in FIG. 5, for the matrix A, computing device 110 may divide it into a plurality of sub-matrices $A_{11}, \ldots, A_{n1}, \ldots, A_{m1}, \ldots A_{mn}$ serving as a plurality of partial inputs. The size of each sub-matrix does not exceed the size division threshold value. Specifically, the number of rows and the number of columns of each sub-matrix do not exceed the size division threshold value. For example, for the scalar b, as mentioned above, since matrices usually cause heavy calculations, and scalars usually do not cause heavy calculations, it is possible to divide the matrices without dividing the scalars.

Figure 6:
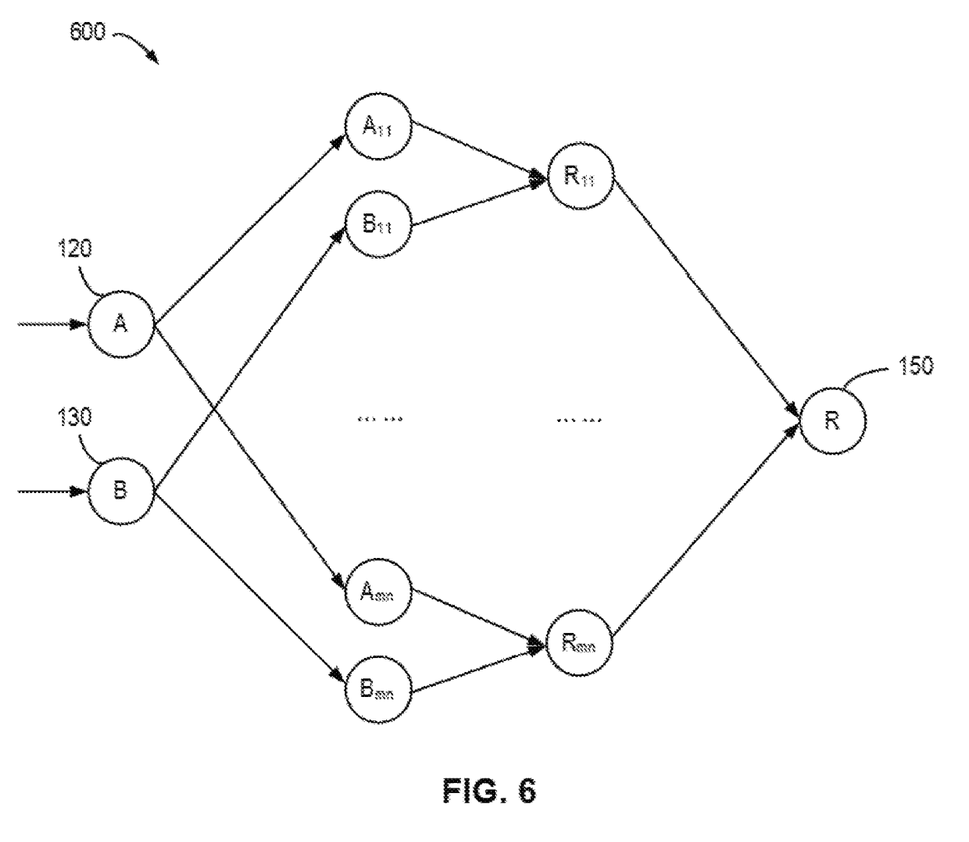
FIG. 6 illustrates a schematic diagram of an example of an element-wise operation division approach between two matrices according to some embodiments of the present disclosure.

FIG. 6 illustrates a schematic diagram of an example of element-wise operation division approach 600 between two matrices according to some embodiments of the present disclosure. It is assumed that first input 120 is an m×n matrix A, second input 130 is an m×n matrix B, and the element-wise calculation is to add the matrix A to the matrix B(A+B). As shown in FIG. 6, for the matrix A, computing device 110 may divide it into a plurality of sub-matrices $A_{11}, \ldots, A_{n1}, \ldots, A_{m1}, \ldots A_{mn}$ serving as a plurality of partial inputs. The size of each sub-matrix does not exceed the size division threshold value. Specifically, the number of rows and the number of columns of each sub-matrix do not exceed the size division threshold value. In addition, for the matrix B, computing device 110 may use the same division approach as that of the matrix A. That is, computing device 110 may divide the matrix B into a plurality of sub-matrices $B_{11}, \ldots, B_{n1}, \ldots, B_{m1}, \ldots, B_{mn}$ serving as a plurality of partial inputs. The size of each sub-matrix does not exceed the size division threshold value.

Figure 7:
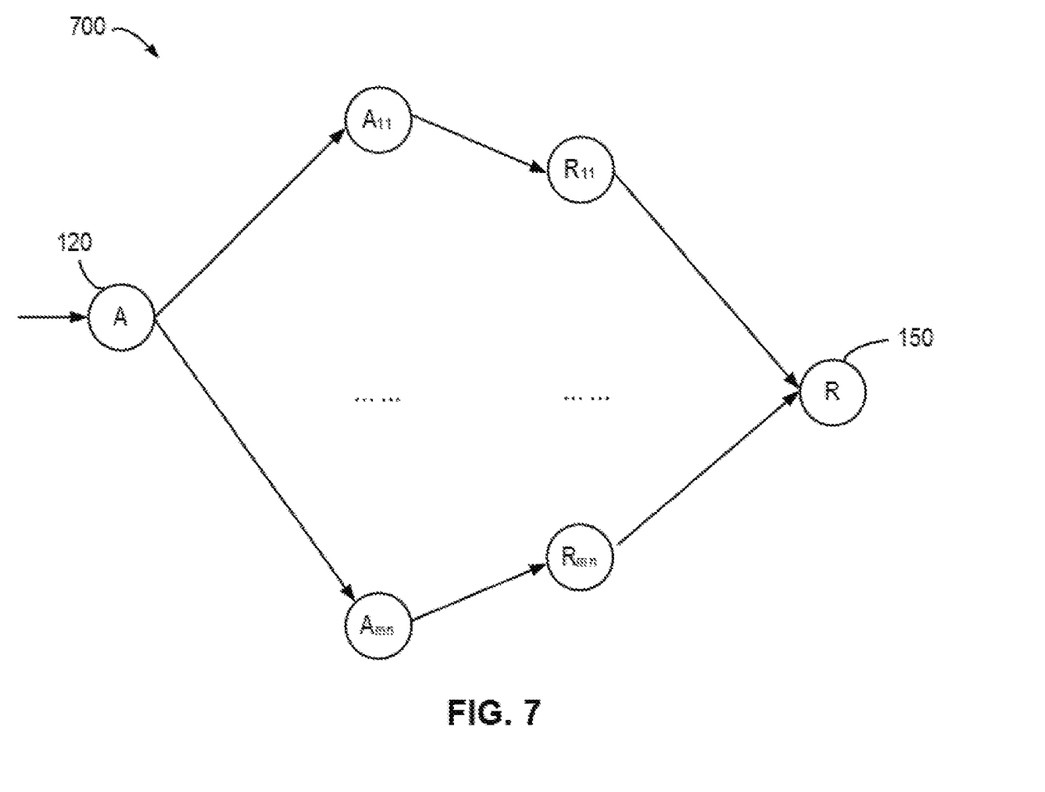
FIG. 7 illustrates a schematic diagram of an example of an element-wise operation division approach according to some embodiments of the present disclosure.

FIG. 7 illustrates a schematic diagram of an example of element-wise operation division approach 700 of one matrix according to some embodiments of the present disclosure. It is assumed that first input 120 is an m×n matrix A, and the element-wise calculation is a single-matrix operation. As shown in FIG. 7, for the matrix A, computing device 110 may divide it into a plurality of sub-matrices $A_{11}, \ldots, A_{n1}, \ldots, A_{m1}, \ldots A_{mn}$ serving as a plurality of partial inputs. The size of each sub-matrix does not exceed the size division threshold value. Specifically, the number of rows and the number of columns of each sub-matrix do not exceed the size division threshold value.

By the approaches listed above, computing device 110 realizes reasonable division of the input of the deep learning model for various different types of operations, thereby avoiding the heavy calculations caused by an input with an excessive data volume, and ensuring the computing efficiency and parallelism.

Since the input of the deep learning model is divided into the plurality of partial inputs, a computing chart will also change accordingly. A computing node that calculates a complete input is changed to a computing node that calculates the partial inputs. The following will describe the calculation of the deep learning model on these partial inputs.

At 230, computing device 110 performs an operation on the plurality of first partial inputs by using deep learning model 140, and generates output 150 of deep learning model 140. In certain embodiments, computing device 110 may perform the operation on the plurality of first partial inputs by using deep learning model 140, and generate a plurality of partial outputs of deep learning model 140. Then, computing device 110 may generate final output 150 by combining these partial outputs.

For example, in the example of FIG. 3, the deep learning model performs operations on partial inputs $A_1, A_2, \ldots, A_n$ and $B_1, B_2, \ldots, B_n$, and generates partial outputs $R_1, R_2, \ldots, R_n$. Then, computing device 110 may combine these partial outputs $R_1, R_2, \ldots, R_n$ to generate output 150, that is, a result R. For example, the combining operation may be achieved through full connection. In addition, under the consideration of the performance, when the GPU performs deep learning calculation, the combining operation may be performed in the CPU, rather than in the GPU, so as to avoid replication between a memory in the CPU and a memory in the GPU; and the combining operation can be efficiently performed in the CPU.

In the example of FIG. 4, for one intermediate partial input C, the deep learning model performs a cross-multiplication operation on the partial inputs $A_{11}, \ldots, A_{n1}, \ldots, A_{m1}, \ldots A_{mn}$ and $C_1, \ldots, C_n$, and partial outputs $D_{11}, \ldots, D_{n1}, \ldots, D_{m1}, \ldots D_{mn}$ are generated. These partial outputs $D_{11}, \ldots, D_{n1}, \ldots, D_{m1}, \ldots D_{mn}$ may be combined into an intermediate output D. For each intermediate partial input, the deep learning model will perform a similar operation to generate an intermediate output. Further, computing device 110 may combine all the intermediate outputs generated for all the intermediate partial inputs to generate output 150, that is, the result R.

In the example of FIG. 5, the deep learning model performs an addition operation on the partial inputs $A_{11}, \ldots, A_{n1}, \ldots, A_{m1}, \ldots A_{mn}$, and the scalar b, and partial outputs $R_{11}, \ldots, R_{n1}, \ldots, R_{m1}, \ldots R_{mn}$ are generated. Then, computing device 110 may combine these partial outputs $R_{11}, \ldots, R_{n1}, \ldots, R_{m1}, \ldots R_{mn}$ to generate output 150, that is, the result R.

In the example of FIG. 6, the deep learning model performs an addition operation on partial inputs $A_{11}, \ldots, A_{n1}, \ldots, A_{m1}, \ldots A_{mn}$ and partial inputs $B_{11}, \ldots, B_{n1}, \ldots, B_{m1}, \ldots B_{mn}$, and partial outputs $R_{11}, \ldots, R_{n1}, \ldots, R_{m1}, \ldots R_{mn}$ are generated. Then, computing device 110 may combine these partial outputs $R_{11}, \ldots, R_{n1}, \ldots, R_{m1}, \ldots R_{mn}$ to generate output 150, that is, the result R.

In addition, in the example of FIG. 7, the deep learning model performs a single-matrix operation on the partial inputs $A_{11}, \ldots, A_{n1}, \ldots, A_{m1}, \ldots A_{mn}$, and partial outputs $R_{11}, \ldots, R_{n1}, \ldots, R_{m1}, \ldots R_{mn}$ are generated. Then, computing device 110 may combine these partial outputs $R_{11}, \ldots, R_{n1}, \ldots, R_{m1}, \ldots R_{mn}$ to generate output 150, that is, the result R.

In this way, the deep learning calculations that originally need to be executed on one device by a large number of threads can be allocated and executed in parallel on a plurality of devices. Since each device only needs to perform a part of the deep learning calculations, the thread consumption is reduced. Thus, it is possible to avoid excessively occupying the thread resources of one device, thereby improving the load balancing and device performance.

Figure 8:
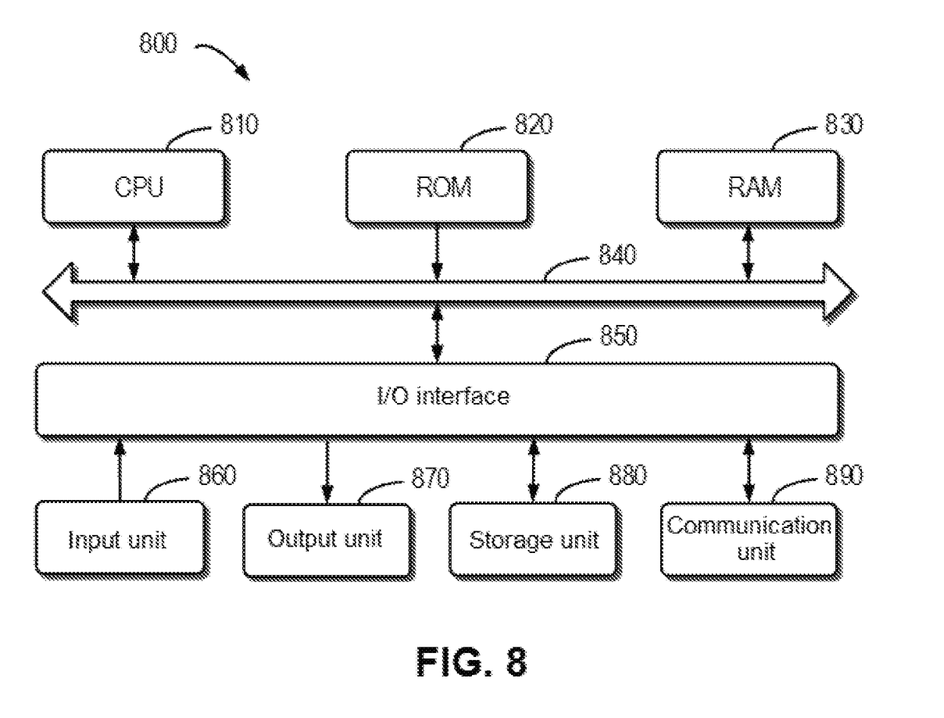
FIG. 8 illustrates a schematic block diagram of an example device for implementing the embodiments of the present disclosure.

FIG. 8 illustrates a schematic block diagram of example device 800 for implementing the embodiments of the present disclosure. For example, computing device 110 as shown in FIG. 1 may be implemented by device 800. As shown in FIG. 8, device 800 includes Central Processing Unit (CPU) 810 which may perform various appropriate actions and processes according to a computer program instruction stored in Read Only Memory (ROM) 820 or a computer program instruction loaded from storage unit 880 into Random Access Memory (RAM) 830. In RAM 830, various programs and data required for the operation of storage device 800 may also be stored. CPU 810, ROM 820, and RAM 830 are connected to each other through bus 840. Input/Output (I/O) interface 850 is also connected to bus 840.

Multiple components in device 800 are connected to I/O interface 850, including: input unit 860, such as a keyboard or a mouse; output unit 870, such as various types of displays or speakers; storage unit 880, such as a magnetic disk or an optical disk; and communication unit 890, such as a network card, a modem, or a wireless communication transceiver. Communication unit 890 allows device 800 to exchange information/data with other devices over a computer network such as the Internet and/or various telecommunication networks.

The various procedures and processes described above, such as method 200, may be performed by processing unit 810. For example, in some embodiments, method 200 may be implemented as a computer software program that is tangibly included in a machine-readable medium, such as storage unit 880. In some embodiments, some or all of the computer programs may be loaded and/or installed onto device 800 via ROM 820 and/or communication unit 890. When the computer programs are loaded to RAM 830 and executed by CPU 810, one or more actions in method 200 described above can be executed.

The present disclosure may be a method, an apparatus, a system, and/or a computer program product. The computer program product may include a computer-readable storage medium having computer-readable program instructions for performing the various aspects of the present disclosure.

The computer-readable storage medium may be a tangible device that may hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk, an RAM, an ROM, an erasable programmable read only memory (EPROM or a flash memory), a static random access memory (SRAM), a portable compact disk read only memory (CD-ROM), a digital versatile disk (DVD), a memory stick, a floppy disk, a mechanically encoding device such as punch-cards or raised structures in a groove having instructions recorded thereon, and any suitable combination of the foregoing. The computer-readable storage medium as used herein is not to be interpreted as a transient signal itself, such as a radio wave or other freely propagating electromagnetic waves, an electromagnetic wave propagating through a waveguide or other transmission media (e.g., a light pulse through a fiber optic cable), or an electrical signal transmitted through an electrical wire.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmissions, wireless transmissions, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In case of a remote computer being involved, the remote computer may be connected to a user computer through any type of network, including an LAN or a WAN, or may be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement the various aspects of the present disclosure.

Various aspects of the present disclosure are described herein with reference to flow charts and/or block diagrams of the methods, apparatuses (systems), and computer program products according to embodiments of the present disclosure. It should be understood that each block of the flow charts and/or block diagrams and a combination of blocks in the flow charts and/or block diagrams can be implemented by the computer-readable program instructions.

These computer-readable program instructions can be provided to a processing unit of a general-purpose computer, a special-purpose computer, or other programmable data processing apparatuses to produce a machine, such that when these instructions are executed by the processing unit of a computer or other programmable data processing apparatuses, an apparatus that implements the functions/actions specified in one or more blocks in the flow charts and/or block diagrams is generated. The computer-readable program instructions may also be stored in a computer-readable storage medium. These instructions enable a computer, a programmable data processing apparatus, and/or other devices to work in a specific manner. Therefore, the computer-readable medium storing the instructions includes a manufactured article that includes instructions for implementing the functions/actions specified in one or more blocks in the flow charts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flow charts and/or block diagrams.

The flow charts and the block diagrams in the accompanying drawings illustrate possible implementations of architectures, functions, and operations of the systems, the methods, and the computer program products according to various embodiments of the present disclosure. In this regard, each block in the flow charts or the block diagrams may represent a part of a module, a program segment, or an instruction, and the part of the module, the program segment, or the instruction includes one or more executable instructions for realizing specified logic functions. In some alternative implementations, the functions marked in the blocks may also occur in an order different from that marked in the accompanying drawings. For example, actually, two continuous blocks may be basically concurrently executed and may also be executed according to a reverse order sometimes, which is decided by the functions involved. It should also be noted that each block in the block diagrams and/or the flow charts as well as a combination of the blocks in the block diagrams and/or the flow charts may be realized by using a dedicated hardware-based system for executing specified functions or actions, or may be realized by using a combination of dedicated hardware and a computer instruction.

Various embodiments of the present disclosure have been described above. The foregoing description is exemplary and not exhaustive, and is not intended to be limited to the disclosed embodiments. Multiple modifications and variations will be apparent to those skilled in the art without departing from the scope and spirit of the illustrated embodiments. The terms used herein are chosen to best explain the principles of the various embodiments, practical applications, or improvements on technologies in the marketplace, or to enable others of ordinary skill in the art to understand the various embodiments disclosed herein.

What is claimed is:

1. A method for processing data, comprising:
   determining a factor associated with a first input of a deep learning model, wherein the factor affects the number of threads for executing the deep learning model;
   generating a plurality of first partial inputs by using the first input based on the factor, wherein each first partial input in the plurality of first partial inputs is a part of the first input; and
   performing an operation on the plurality of first partial inputs by using the deep learning model, and generating an output of the deep learning model;
   wherein the operation is performed in parallel on select ones of the first partial inputs of the plurality of first partial inputs;
   wherein the factor determined is at least one of a channel number and a size;
   wherein when the factor is the size, the operation performed by the deep learning model is a cross-multiplication operation, the deep learning model further has a second input, and the first input is divided into the plurality of first partial inputs based on determined relative sizes of the first input and the second input; and
   wherein the method is performed by at least one processing device comprising a processor coupled to a memory.

2. The method according to claim 1, wherein the first input is an image, and determining the factor comprises at least one of the following:
   when it is determined that the channel number of the image exceeds a channel threshold value, determining the factor as the channel number; and
   when it is determined that the size of at least one of a height or a width of the image exceeds a size threshold value, determining the factor as the size.

3. The method according to claim 1, wherein when the factor is the channel number, generating the plurality of first partial inputs comprises:
   dividing the first input into the plurality of first partial inputs, wherein the channel number of each first partial input in the plurality of first partial inputs is associated with a channel division threshold value.

4. The method according to claim 1, wherein when the factor is the size, generating the plurality of first partial inputs comprises:
   determining the type of the operation to be executed by using the deep learning model on the plurality of first partial inputs; and
   dividing the first input into the plurality of first partial inputs by using a size division threshold value based on the type.

5. The method according to claim 4, wherein the operation of the type is the cross-multiplication operation; the deep learning model further has the second input; the first input and the second input are respectively matrices representing images; and dividing the first input into the plurality of first partial inputs by using the size division threshold value based on the type comprises:
   when it is determined that the size of the first input exceeds the size of the second input, dividing the first input into a plurality of sub-matrices serving as the plurality of first partial inputs, wherein the size of each sub-matrix does not exceed the size division threshold value.

6. The method according to claim 5, wherein dividing the first input into the plurality of first partial inputs by using the size division threshold value based on the type further comprises:
   when it is determined that the size of the first input is less than the size of the second input, dividing the first input into a plurality of intermediate partial inputs, wherein each intermediate partial input is a matrix comprising at least one column vector of the first input; and
   dividing each intermediate partial input in the plurality of intermediate partial inputs into a plurality of sub-matrices serving as the plurality of first partial inputs, wherein the size of each sub-matrix does not exceed the size division threshold value.

7. The method according to claim 4, wherein the operation of the type is an element-wise operation; the first input is a matrix representing an image; and dividing the first input into the plurality of first partial inputs by using the size division threshold value based on the type comprises:
   dividing the first input into a plurality of sub-matrices serving as the plurality of first partial inputs, wherein the size of each sub-matrix does not exceed the size division threshold value.

8. The method according to claim 1, wherein generating the output of the deep learning model comprises:
   performing the operation on the plurality of first partial inputs by using the deep learning model, and generating a plurality of partial outputs of the deep learning model; and
   combining the plurality of partial outputs to generate the output.

9. An electronic device, comprising:
   at least one processing unit;
   at least one memory, the at least one memory being coupled to the at least one processing unit and storing an instruction executed by the at least one processing unit, wherein the instruction, when executed by the at least one processing unit, causes the device to perform actions, and the actions comprise:
   determining a factor associated with a first input of a deep learning model, wherein the factor affects the number of threads for executing the deep learning model;
   generating a plurality of first partial inputs by using the first input based on the factor, wherein each first partial input in the plurality of first partial inputs is a part of the first input; and
   performing an operation on the plurality of first partial inputs by using the deep learning model, and generating an output of the deep learning model;
   wherein the operation is performed in parallel on select ones of the first partial inputs of the plurality of first partial inputs;
   wherein the factor determined is at least one of a channel number and a size; and
   wherein when the factor is the size, the operation performed by the deep learning model is a cross-multiplication operation, the deep learning model further has a second input, and the first input is divided into the plurality of first partial inputs based on determined relative sizes of the first input and the second input.

10. The device according to claim 9, wherein the first input is an image, and determining the factor comprises at least one of the following:
   when it is determined that the channel number of the image exceeds a channel threshold value, determining the factor as the channel number; and
   when it is determined that the size of at least one of a height or a width of the image exceeds a size threshold value, determining the factor as the size.

11. The device according to claim 9, wherein when the factor is the channel number, generating the plurality of first partial inputs comprises:
   dividing the first input into the plurality of first partial inputs, wherein the channel number of each first partial input in the plurality of first partial inputs is associated with a channel division threshold value.

12. The device according to claim 9, wherein when the factor is the size, generating the plurality of first partial inputs comprises:
   determining the type of the operation to be executed by using the deep learning model on the plurality of first partial inputs; and
   dividing the first input into the plurality of first partial inputs by using a size division threshold value based on the type.

13. The device according to claim 12, wherein the operation of the type is the cross-multiplication operation; the deep learning model further has the second input; the first input and the second input are respectively matrices representing images; and dividing the first input into the plurality of first partial inputs by using the size division threshold value based on the type comprises:
   when it is determined that the size of the first input exceeds the size of the second input, dividing the first input into a plurality of sub-matrices serving as the plurality of first partial inputs, wherein the size of each sub-matrix does not exceed the size division threshold value.

14. The device according to claim 13, wherein dividing the first input into the plurality of first partial inputs by using the size division threshold value based on the type further comprises:
   when it is determined that the size of the first input is less than the size of the second input, dividing the first input into a plurality of intermediate partial inputs, wherein each intermediate partial input is a matrix comprising at least one column vector of the first input; and
   dividing each intermediate partial input in the plurality of intermediate partial inputs into a plurality of sub-matrices serving as the plurality of first partial inputs, wherein the size of each sub-matrix does not exceed the size division threshold value.

15. The device according to claim 12, wherein the operation of the type is an element-wise operation; the first input is a matrix representing an image; and dividing the first input into the plurality of first partial inputs by using the size division threshold value based on the type comprises:
   dividing the first input into a plurality of sub-matrices serving as the plurality of first partial inputs, wherein the size of each sub-matrix does not exceed the size division threshold value.

16. The device according to claim 9, wherein generating the output of the deep learning model comprises:
   performing the operation on the plurality of first partial inputs by using the deep learning model, and generating a plurality of partial outputs of the deep learning model; and
   combining the plurality of partial outputs to generate the output.

17. A computer program product, wherein the computer program product is tangibly stored on a non-transitory computer readable medium and comprises a machine-executable instruction; and the machine-executable instruction, when executed, causes a machine to perform the steps of:
   determining a factor associated with a first input of a deep learning model, wherein the factor affects the number of threads for executing the deep learning model;
   generating a plurality of first partial inputs by using the first input based on the factor, wherein each first partial input in the plurality of first partial inputs is a part of the first input; and
   performing an operation on the plurality of first partial inputs by using the deep learning model, and generating an output of the deep learning model;
   wherein the operation is performed in parallel on select ones of the first partial inputs of the plurality of first partial inputs;
   wherein the factor determined is at least one of a channel number and a size; and
   wherein when the factor is the size, the operation performed by the deep learning model is a cross-multiplication operation, the deep learning model further has a second input, and the first input is divided into the plurality of first partial inputs based on determined relative sizes of the first input and the second input.

18. The computer program product according to claim 17, wherein the first input is an image, and determining the factor comprises at least one of the following:
   when it is determined that the channel number of the image exceeds a channel threshold value, determining the factor as the channel number; and
   when it is determined that the size of at least one of a height or a width of the image exceeds a size threshold value, determining the factor as the size.

19. The computer program product according to claim 17, wherein when the factor is the channel number, generating the plurality of first partial inputs comprises:
- dividing the first input into the plurality of first partial inputs, wherein the channel number of each first partial input in the plurality of first partial inputs is associated with a channel division threshold value.

20. The computer program product according to claim 17, wherein when the factor is the size, generating the plurality of first partial inputs comprises:
- determining the type of the operation to be executed by using the deep learning model on the plurality of first partial inputs; and
- dividing the first input into the plurality of first partial inputs by using a size division threshold value based on the type.

* * * * *